United States Patent
Bittar et al.

(10) Patent No.: US 8,957,683 B2
(45) Date of Patent: Feb. 17, 2015

(54) HIGH FREQUENCY DIELECTRIC MEASUREMENT TOOL

(75) Inventors: Michael S. Bittar, Houston, TX (US); Jing Li, Pearland, TX (US)

(73) Assignee: Halliburton Energy Services, Inc., Houston, TX (US)

(*) Notice: Subject to any disclaimer, the term of this patent is extended or adjusted under 35 U.S.C. 154(b) by 156 days.

(21) Appl. No.: 13/128,676

(22) PCT Filed: Aug. 11, 2009

(86) PCT No.: PCT/US2009/053354
§ 371 (c)(1),
(2), (4) Date: May 11, 2011

(87) PCT Pub. No.: WO2010/059275
PCT Pub. Date: May 27, 2010

(65) Prior Publication Data
US 2011/0221443 A1 Sep. 15, 2011

Related U.S. Application Data

(60) Provisional application No. 61/117,433, filed on Nov. 24, 2008.

(51) Int. Cl.
*G01V 3/10* (2006.01)
*G01V 3/18* (2006.01)
*G01V 3/30* (2006.01)

(52) U.S. Cl.
CPC ... *G01V 3/30* (2013.01); *G01V 3/18* (2013.01); *G01V 3/10* (2013.01)
USPC ........... 324/339; 324/324; 324/338; 324/345; 324/351; 324/346; 324/303; 324/356; 702/11; 702/12; 702/13

(58) Field of Classification Search
CPC ......... E21B 43/26; E21B 34/06; E21B 34/14; E21B 21/08; E21B 47/123; E21B 49/08; E21B 47/00
USPC ................. 324/324, 338–345, 351, 357, 346; 702/11–13
See application file for complete search history.

(56) References Cited

U.S. PATENT DOCUMENTS

| 3,496,455 | A | | 2/1970 | Gouilloud |
| 3,845,299 | A | * | 10/1974 | Givens .......................... 376/164 |

(Continued)

FOREIGN PATENT DOCUMENTS

| AU | 2009318042 | 2/2014 |
| EP | 1315984 | 1/2011 |

(Continued)

OTHER PUBLICATIONS

Anderson et al., "Observations of Large Dielectric Effects on LWD Propagation-Resistivity Logs", SPWLA 48th Annual Logging Symposium, Jun. 3-6, 2007, p. 1-11.*

(Continued)

*Primary Examiner* — Patrick Assouad
*Assistant Examiner* — Lamarr Brown
(74) *Attorney, Agent, or Firm* — Krueger Iselin LLP; Benjamin Fite

(57) ABSTRACT

Disclosed dielectric logging tools and methods employ three or more receive horn antennas positioned between at least two transmit antennas, which can also be horn antennas. The logging tools can operate in the range between 100 MHz and 10 GHz to provide logs of formation permittivity, formation conductivity, standoff distance, and electrical properties of material in the standoff gap. Logs of water-saturated porosity and/or oil movability can be readily derived. The presence of additional receive antennas offers a significantly extended operating range, additional depths of investigation, increased measurement accuracy, and further offers compensation for tool standoff and mudcake effects. In both wireline and logging while drilling embodiments, at least some disclosed dielectric logging tools employ a set of three axially-spaced receive antennas positioned between pairs of axially-spaced transmit antennas. At least some disclosed methods employ absolute amplitude and phase measurements in response to alternate firings of the transmit antennas.

21 Claims, 9 Drawing Sheets

(56) References Cited

U.S. PATENT DOCUMENTS

| | | | |
|---|---|---|---|
| 3,849,721 A | 11/1974 | Calvert | |
| 3,914,603 A * | 10/1975 | Paap et al. | 250/269.2 |
| 3,944,910 A | 3/1976 | Rau | |
| 4,258,321 A | 3/1981 | Neale | |
| 4,278,941 A | 7/1981 | Freedman | |
| 4,297,699 A | 10/1981 | Fowler et al. | |
| 4,430,653 A | 2/1984 | Coon et al. | |
| 4,482,634 A * | 11/1984 | Davis et al. | 436/31 |
| 4,504,833 A | 3/1985 | Fowler et al. | |
| 4,626,773 A * | 12/1986 | Kroeger et al. | 324/642 |
| 4,670,717 A | 6/1987 | Sender | |
| 4,689,569 A | 8/1987 | Duff | |
| 4,704,581 A * | 11/1987 | Clark | 324/341 |
| 4,721,853 A * | 1/1988 | Wraight | 250/269.7 |
| 4,730,161 A | 3/1988 | Cox et al. | |
| 4,814,768 A | 3/1989 | Chang | |
| 4,968,940 A | 11/1990 | Clark et al. | |
| 5,133,418 A | 7/1992 | Gibson et al. | |
| 5,159,978 A * | 11/1992 | Tomek et al. | 166/254.2 |
| 5,210,495 A | 5/1993 | Hapashey et al. | |
| 5,345,179 A * | 9/1994 | Habashy et al. | 324/338 |
| 5,367,262 A | 11/1994 | Manning | |
| 5,377,105 A * | 12/1994 | Smith | 702/8 |
| 5,389,881 A | 2/1995 | Bittar et al. | |
| 5,420,589 A | 5/1995 | Wells et al. | |
| 5,434,507 A * | 7/1995 | Beren et al. | 324/338 |
| 5,469,062 A | 11/1995 | Meyer, Jr. | |
| 5,530,359 A | 6/1996 | Habashy et al. | |
| 5,552,786 A | 9/1996 | Xia et al. | |
| 5,631,562 A | 5/1997 | Cram et al. | |
| 5,720,355 A | 2/1998 | Lamine et al. | |
| 5,757,191 A | 5/1998 | Gianzero | |
| 5,811,973 A | 9/1998 | Meyer, Jr. | |
| 5,892,361 A | 4/1999 | Meyer, Jr. et al. | |
| 5,900,833 A | 5/1999 | Sunlin et al. | |
| 6,100,839 A | 8/2000 | Heger et al. | |
| 6,163,155 A | 12/2000 | Bittar | |
| 6,173,793 B1 * | 1/2001 | Thompson et al. | 175/45 |
| 6,179,066 B1 * | 1/2001 | Nasr et al. | 175/45 |
| 6,181,138 B1 | 1/2001 | Hagiwara et al. | |
| 6,191,586 B1 | 2/2001 | Bittar | |
| 6,218,842 B1 * | 4/2001 | Bittar et al. | 324/339 |
| 6,353,321 B1 * | 3/2002 | Bittar | 324/338 |
| 6,359,438 B1 | 3/2002 | Bittar | |
| 6,389,438 B1 | 5/2002 | Zhou | |
| 6,476,609 B1 | 11/2002 | Bittar | |
| 6,538,447 B2 | 3/2003 | Bittar | |
| 6,633,252 B2 | 10/2003 | Stolarczyk et al. | |
| 6,651,739 B2 | 11/2003 | Arndt et al. | |
| 6,712,140 B2 | 3/2004 | Van Oers et al. | |
| 6,714,153 B1 | 3/2004 | Kong et al. | |
| 6,765,385 B2 | 7/2004 | Sinclair et al. | |
| 6,771,206 B2 | 8/2004 | Berthelier et al. | |
| 6,778,127 B2 | 8/2004 | Stolarczyik et al. | |
| 6,799,117 B1 * | 9/2004 | Proett et al. | 702/12 |
| 6,810,331 B2 | 10/2004 | Bittar et al. | |
| 6,819,110 B2 * | 11/2004 | Omeragic et al. | 324/338 |
| 6,885,943 B2 | 4/2005 | Bittar et al. | |
| 6,911,824 B2 | 6/2005 | Bittar | |
| 6,940,446 B2 | 9/2005 | Cist | |
| 6,944,546 B2 | 9/2005 | Xiao et al. | |
| 6,958,610 B2 | 10/2005 | Gianzero | |
| 6,961,663 B2 | 11/2005 | Sinclair et al. | |
| 7,013,991 B2 | 3/2006 | Wilson-Langman et al. | |
| 7,019,528 B2 | 3/2006 | Bittar | |
| 7,038,455 B2 * | 5/2006 | Beste et al. | 324/333 |
| 7,046,009 B2 | 5/2006 | Itskovich | |
| 7,046,010 B2 | 5/2006 | Hu et al. | |
| 7,062,072 B2 | 6/2006 | Herve Anxionnaz et al. | |
| 7,098,664 B2 | 8/2006 | Bittar et al. | |
| 7,098,858 B2 | 8/2006 | Bittar et al. | |
| 7,123,016 B2 | 10/2006 | Larsen | |
| 7,138,803 B2 | 11/2006 | Bittar | |
| 7,143,844 B2 | 12/2006 | Alft et al. | |
| 7,202,670 B2 | 4/2007 | Omeragic et al. | |
| 7,227,363 B2 | 6/2007 | Gianzero et al. | |
| 7,265,552 B2 | 9/2007 | Bittar | |
| 7,336,222 B2 | 2/2008 | Praskovsky et al. | |
| 7,345,487 B2 | 3/2008 | Bittar et al. | |
| 7,350,568 B2 | 4/2008 | Mandal et al. | |
| 7,425,830 B2 | 9/2008 | Banning et al. | |
| 7,425,831 B2 | 9/2008 | Banning et al. | |
| 7,427,863 B2 | 9/2008 | Bittar | |
| 7,557,579 B2 * | 7/2009 | Bittar | 324/337 |
| 7,557,580 B2 | 7/2009 | Bittar | |
| 7,609,065 B2 | 10/2009 | Banning et al. | |
| 7,659,722 B2 | 2/2010 | Bittar | |
| 7,746,078 B2 | 6/2010 | Bittar et al. | |
| 7,839,148 B2 | 11/2010 | Vehra et al. | |
| 7,839,346 B2 | 11/2010 | Bittar et al. | |
| 7,948,238 B2 | 5/2011 | Bittar | |
| 7,982,464 B2 | 7/2011 | Bittar et al. | |
| 8,004,282 B2 | 8/2011 | Itskovich | |
| 8,096,355 B2 | 1/2012 | McDaniel et al. | |
| 8,264,228 B2 | 9/2012 | Bittar et al. | |
| 8,378,908 B2 | 2/2013 | Wisler et al. | |
| 2002/0167314 A1 * | 11/2002 | Prammer | 324/303 |
| 2002/0177427 A1 * | 11/2002 | Nadgauda et al. | 455/403 |
| 2002/0195247 A1 * | 12/2002 | Ciglenec et al. | 166/250.11 |
| 2003/0184302 A1 | 10/2003 | Omeragic et al. | 324/338 |
| 2004/0008027 A1 * | 1/2004 | Prammer | 324/303 |
| 2004/0019427 A1 | 1/2004 | San Martin et al. | |
| 2004/0108853 A1 * | 6/2004 | Rosthal | 324/343 |
| 2004/0196184 A1 * | 10/2004 | Hollander et al. | 342/418 |
| 2004/0200274 A1 * | 10/2004 | Moake et al. | 73/152.05 |
| 2004/0245991 A1 * | 12/2004 | Hayman et al. | 324/374 |
| 2005/0030035 A1 * | 2/2005 | Beste et al. | 324/338 |
| 2005/0083063 A1 * | 4/2005 | Omeragic et al. | 324/338 |
| 2005/0134279 A1 * | 6/2005 | Hu et al. | 324/367 |
| 2005/0134280 A1 * | 6/2005 | Bittar et al. | 324/367 |
| 2006/0022887 A1 | 2/2006 | Bittar | |
| 2006/0157277 A1 * | 7/2006 | Bittar et al. | 175/26 |
| 2006/0220952 A1 * | 10/2006 | Aoki | 342/175 |
| 2006/0244455 A1 | 11/2006 | Bittar | |
| 2006/0255811 A1 | 11/2006 | Bittar et al. | |
| 2007/0235225 A1 | 10/2007 | Bittar | |
| 2008/0078580 A1 * | 4/2008 | Bittar | 175/41 |
| 2008/0079432 A1 * | 4/2008 | Meyer et al. | 324/338 |
| 2008/0128166 A1 * | 6/2008 | Forgang et al. | 175/50 |
| 2008/0218400 A1 * | 9/2008 | Stolarczyk et al. | 342/22 |
| 2008/0315884 A1 | 12/2008 | Bittar et al. | |
| 2009/0015260 A1 | 1/2009 | Bittar | |
| 2009/0210161 A1 * | 8/2009 | Duenckel et al. | 702/8 |
| 2009/0224764 A1 | 9/2009 | Bittar | |
| 2009/0230968 A1 * | 9/2009 | Bittar et al. | 324/338 |
| 2009/0278543 A1 | 11/2009 | Beste et al. | |
| 2009/0302851 A1 | 12/2009 | Bittar et al. | |
| 2009/0309798 A1 | 12/2009 | Bittar et al. | |
| 2009/0310441 A1 | 12/2009 | Johnson et al. | |
| 2010/0012377 A1 | 1/2010 | Sharp et al. | |
| 2010/0117655 A1 | 5/2010 | Bittar | |
| 2010/0127708 A1 | 5/2010 | Bittar | |
| 2010/0262370 A1 | 10/2010 | Bittar et al. | |
| 2011/0006773 A1 | 1/2011 | Bittar | |
| 2011/0251794 A1 * | 10/2011 | Bittar et al. | 702/11 |

FOREIGN PATENT DOCUMENTS

| | | |
|---|---|---|
| EP | 1155343 | 3/2011 |
| FR | 2561395 | 9/1985 |
| GB | 1111629 | 5/1968 |
| GB | 1363079 | 8/1974 |
| GB | 2475456 | 11/2012 |
| JP | 4001392 | 1/1992 |
| JP | 8094737 | 4/1996 |
| WO | WO-00/00852 | 1/2000 |
| WO | WO-01/48353 | 7/2001 |
| WO | WO-03/080988 | 10/2003 |
| WO | WO-2006/079154 | 8/2006 |
| WO | WO-2007/149106 | 12/2007 |
| WO | WO-2007/149146 | 12/2007 |
| WO | WO-2007/714916 | 12/2007 |

(56) References Cited

FOREIGN PATENT DOCUMENTS

| WO | WO-2008/021868 | 2/2008 |
|---|---|---|
| WO | WO-2010/059275 | 5/2010 |
| WO | WO-2010/060040 | 5/2010 |

OTHER PUBLICATIONS

Everrt Slob, "Closed loop hydrogeophysical inversion of time-lapse GPR data to determine hydraulic properties of a sandy soil", SEG Las Vegas 2008 Annual Meeting, p. 1183-1187.*
Federal Communications Commission, "Revision of Part 15 of the Commission's Rules Regarding Ultra-Wideband Transmission Systems", FCC 02-48, Adopted: Feb. 14, 2002, Released: Apr. 22, 2002, p. 1-118.*
De et al., "Ultrabroadband Electromagnetic Well Logging: A Potential Future Technology", SPWLA 33rd Annual Logging Sysmposium, Jun. 14-17, 1992, p. 1-23.*
Bittar, Michael S., "A New Azimuthal Deep-Reading Resistivity Tool for Geosteering and Advanced Formation Evaluation", 2007 SPE Annual Technical Conference and Exhibition, SPE 109971, Anaheim, CA, USA, (Nov. 11, 2007). pp. 1-9.
Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 09/238,832, filed Jan. 28, 1999.
Bittar, Michael S., "Electromagnetic Wave Resistivity Tool Having a Tilted Antenna for Geosteering Within a Desired Payzone", U.S. Appl. No. 09/615,501, filed Jul. 13, 2000.
Bittar, Michael S., "Resistivity Logging with Reduced Dip Artifacts", PCT Appl No. US2007/075455, filed Aug. 8, 2006.
Bittar, Michael S., et al., "A 3D Borehole Imager and a Dielectric Measurement Tool", PCT Appl No. US09/65537, filed Nov. 23, 2009.
Bittar, Michael S., et al., "A True Multiple Depth of Investigation Electromagnetic Wave Resistivity Sensor: Theory, Experiment, and Prototype Field Test Results", SPE 22705, 66th Annual Technical Conference and Exhibition of the SPE, Dallas, TX, (Oct. 6, 1991). pp. 1-8, plus 10 pgs. of Figures.
Bittar, Michael S., et al., "Antenna Coupling Component Measurement Tool Having a Rotating Antenna Configuration", PCT Appl No. US06/062149, filed Dec. 15, 2006.
Bittar, Michael S., et al., "Antenna Coupling Component Measurement Tool Having a Rotating Antenna Confirguration", U.S. Appl. No. 12/294,557, filed Sep. 25, 2008.
Bittar, Michael S., et al., "EM-Guided Drilling Relative to an Existing Borehole", U.S. Appl. No. 12/526,552, filed Aug. 10, 2009.
Bittar, Michael S., et al., "Invasion Profiling with a Multiple Depth of Investigation, Electromagnetic Wave Resistivity Sensor", SPE 28425, 69th Annual Technical Conference and Exhibition of the SPE, New Orleans, LA, (Sep. 25, 1994), pp. 1-12, plus 11 pgs. of Figures.
Bittar, Michael S., et al., "Look-Ahead Boundary Detection and Distance Measurement", U.S. Appl. No. 12/067,582, filed Mar. 20, 2008.
Bittar, Michael S., et al., "Method and Apparatus for Building a Tilted Antenna", U.S. Appl. No. 12/306,954, filed Dec. 30, 2008.
Bittar, Michael S., et al., "Method and Apparatus Having Antennas Configured to Measure Electrical Anisotropy", U.S. Appl. No. 12/088,061, filed Mar. 25, 2008.
Bittar, Michael S., et al., "Method and Apparatus with High Resolution Electrode Configuration for Imaging in Oil-Based Muds", U.S. Appl. No. 12/680,868, filed Mar. 30, 2010.
Bittar, Michael S., et al., "Modular Geosteering Tool Assembly", U.S. Appl. No. 12/306,267, filed Dec. 23, 2008.
Bittar, Michael S., et al., "Multimodal Geosteering Systems and Methods", U.S. Appl. No. 12/679,502, filed Mar. 23, 2010.
Bittar, Michael S., et al., "Robust Inversion Systems and Methods for Azimuthally Sensitive Resistivity Logging Tools", U.S. Appl. No. 12/299,760, filed Nov. 5, 2008.
Bittar, Michael S., et al., "Robust Inversion Systems and Methods for Azimuthally Sensitive Resistivity Logging Tools", U.S. Appl. No. 12/229,760, filed Nov. 5, 2008.
Bittar, Michael S., et al., "Systems and Methods for Displaying Logging Data", U.S. Appl. No. 12/295,158, filed Sep. 29, 2008.
Bittar, Michael S., et al., "Systems and Methods Having Radially Offset Antennas for Electromagnetic Resistivity Logging", U.S. Appl. No. 12/300,876, filed Nov. 14, 2008.
Bittar, Michael S., et al., "The Effects of Rock Anisotropy on MWD Electromagnetic Wave Resistivity Sensors", The Log Analyst, (Jan. 1996). pp. 20-30.
Bittar, Michael S., et al., "The Effects of Rock Anisotropy on MWD Electromagnetic Wave Resistivity Sensors", SPWLA 35th Annual Logging Symposium, (Jun. 19, 1994). 18 pgs.
Bonner, S. et al., "A New Generation of Electrode Resistivity Measurements for Formation Evaluation While Drilling", SPWLA 35th Annual Logging Symposium, (Jun. 19, 1994). pp. 1-19.
Cheung, P. et al., "Field Test Results of a New Oil-Based Mud Formation Imager Tool", SPWLA 42nd Annual Logging Symposium, (Jun. 17, 2001). pp. 1-14.
Clark, Brian et al., "A Dual Depth Resistivity Measurement for Fewd", SPWLA 29th Annual Logging Symposium, (Jun. 1988). 25 pgs.
Clark, Brian et al., "Electromagnetic Propagation Logging While Drilling: Theory and Experiment", SPE Formation Evaluation, (Sep. 1990). pp. 263-271.
Hagiwara, T. "A New Method to Determine Horizontal-Resistivity in Anisotropic Formations Without Prior Knowledge of Relative Dip", 37th Annual SPWLA Logging Symposium, New Orleans, LA, (Jun. 16, 1996).pp. 1-5 , plus 3 pgs of Figs.
Int'l Search Report and Written Opinion, dated Oct. 8, 2009, Appl No. PCT/US09/053354, "A High Frequency Dielectric Measurement Tool", filed Aug. 11, 2009. 11 pgs.
Lofts, J. et al., "A New Micor-Resistivity Imaging Device for Use in Oil-Based Mud", SPWLA 43rd Annual Logging Symposium, (Jun. 2, 2002). pp. 1-14.
Luling, M. et al., "Processing and Modeling 2-MHz Resistivity Tools in Dipping, Laminated, Anisotropic Formations: SPWLA", SPWLA 35th Annual Logging Symposium, paper QQ, (1994). pp. 1-25.
Mack, S. G., et al., "MWD Tool Accurately Measures Four Resistivities", Oil & Gas Journal, (May 25, 1992). pp. 1-5.
Mechetin, V. F., et al., "Temp—A New Dual Electromagnetic and Laterolog Apparatus—Technological Complex", All-Union Research Logging Institute, Ufa, USSR. Ch. Ostrander, Petro Physics Int'l, Dallas, Texas, USA, (Date Unkn). 17 pgs.
Meyer, W. H., "New Two Frequency Propagation Resistivity Tools", SPWLA 36th Annual Logging Symposium, (Jun. 26-29, 1995). 12 pgs.
Rodney, Paul F., et al., "Electromagnetic Wave Resistivity MWD Tool", SPE Drilling Engineering, (Oct. 1986). pp. 37-346.
Zhu, Tianfei et al., "Two Dimensional Velocity Inversion and Synthetic Seismogram Computation", Geophysics, vol. 52, No. 1, (Jan. 1987). pp. 37-49.
PCT International Search Report and Written Opinion, dated Oct. 20, 2009, Appl No. PCT/US2009/054470, "Fracture Characterization Using Directional Electromagnetic Resistivity Measurements", filed Aug. 20, 2009, 13 pgs.
PCT International Search Report and Written Opinion, dated Jan. 19, 2010, Appl No. PCT/US2009/065537, "A 3D Borehole Imager", filed Nov. 23, 2009, 7 pgs.
Daniels, David J., "Surface-Penetrating Radar", Electronics & Communication Engineering Journal, Aug. 1996, pp. 165-182.
Liu, Sixin, et al., "Electromagnetic Logging Technique Based on Borehole Radar", IEEE Transactions on Geoscience and Remote Sensing, vol. 40, No. 9, Sep. 2002, pp. 2083-2092.
Liu, Sixin, et al., "Application of Borehole Radar for Subsurface Physical Measurement", Nanjing Institute of Geophysical Prospecting and Institute of Physics Publishing, J. Geophys. Eng. 1 (2004), pp. 221-227.
Van Dongen, Koen W., et al., "A Directional Borehole Radar System", Subsurface Sensing Technologies and Applications, vol. 3, No. 4, Oct. 2002, pp. 327-346, Delft University of Technology, Delft, The Netherlands.

(56) References Cited

OTHER PUBLICATIONS

Callaghan, G. "HFSS Modeling of Cross-Coupling in Borehole Radar", The Institution of Electrical Engineers, printed and published by IEEE, 2002, pp. 217-221, Savoy Place, London WC2R 0BL, UK.

PCT International Preliminary Report on Patentability, dated Jun. 3, 2011, Appl No. PCT/US2009/065537, "A 3D Borehole Imager", filed Nov. 23, 2009, 6 pgs.

PCT International Preliminary Report on Patentability, dated Jun. 3, 2011, Appl No. PCT/US2009/053354, "A High Frequency Dielectric Measurement Tool", filed Aug. 11, 2009, 8 pgs.

PCT International Search Report and Written Opinion, dated Jul. 26, 2011, Appl No. PCT/US2011/032865, "Multicomponent Borehole Radar Systems and Methods", filed Apr. 18, 2011, 8 pgs.

AU First Exam Report, dated Feb. 3, 2012, Appl No. 2009318042, "A High Frequency Dielectric Measurement Tool", filed Aug. 11, 2009, 4 pgs.

PCT International Preliminary Report on Patentability, dated Mar. 1, 2012, Appl No. PCT/US2009/054470, "Fracture Characterization Using Directional Electromagnetic Resistivity Measurements", filed Aug. 20, 2009, 9 pgs.

AU Second Exam Report, dated Mar. 1, 2013, Appl No. 2009318042, "A High Frequency Dielectric Measurement Tool", filed Aug. 11, 2009, 4 pgs.

US Non-Final Office Action, dated Mar. 13, 2013, U.S. Appl. No. 13/061,759, "A 3D Borehole Imager", filed Nov. 23, 2009, 17 pgs.

AU Third Examination Report, dated Jul. 3, 2013, Appl No. 2009318042, "A High Frequency Dielectric Measurement Tool", filed Aug. 11, 2009, 3 pgs.

US Non-Final Office Action, dated Sep. 24, 2013, U.S. Appl. No. 13/061,759, "A 3D Borehole Imager", filed Nov. 23, 2009, 12 pgs.

* cited by examiner

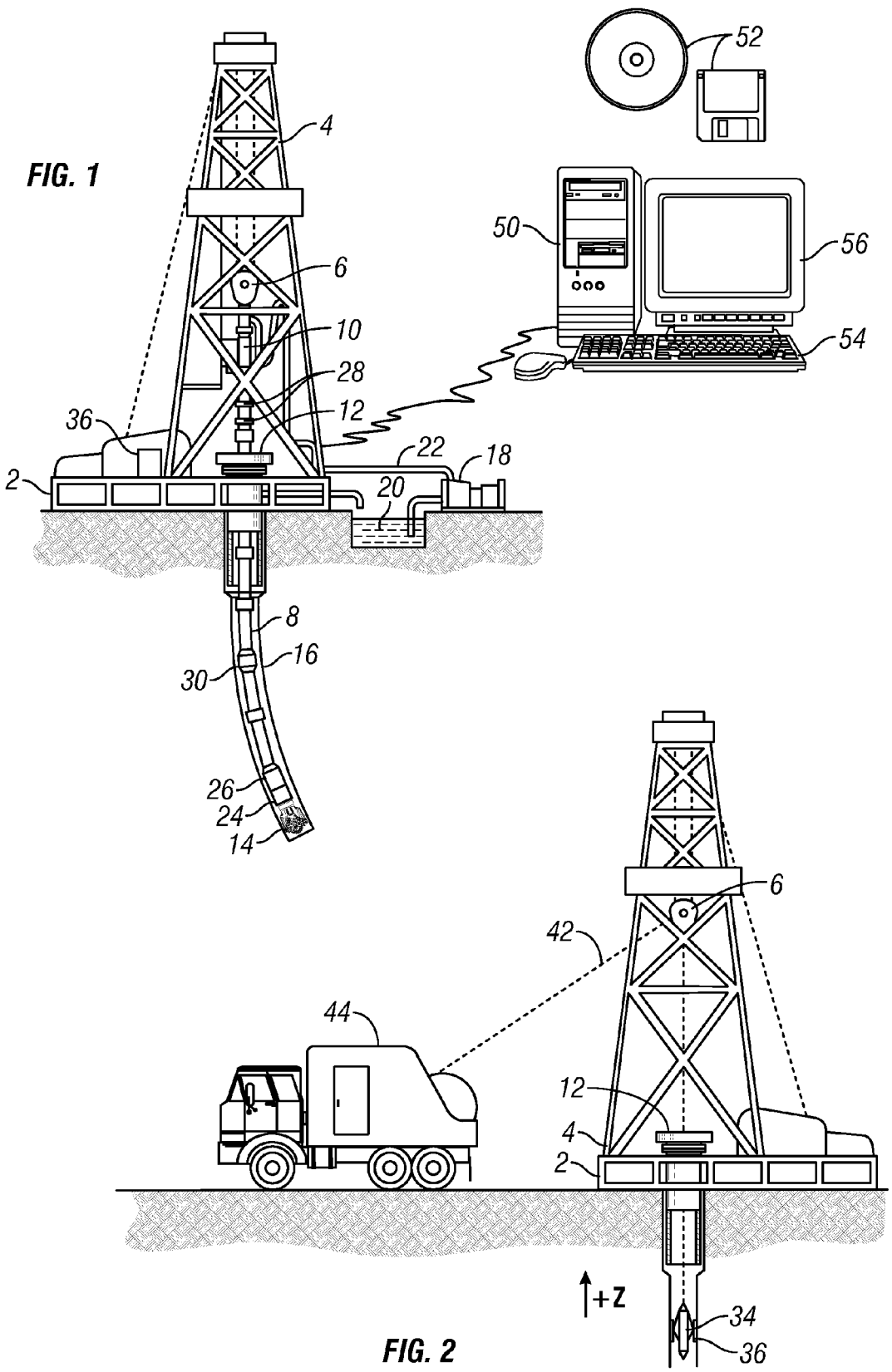

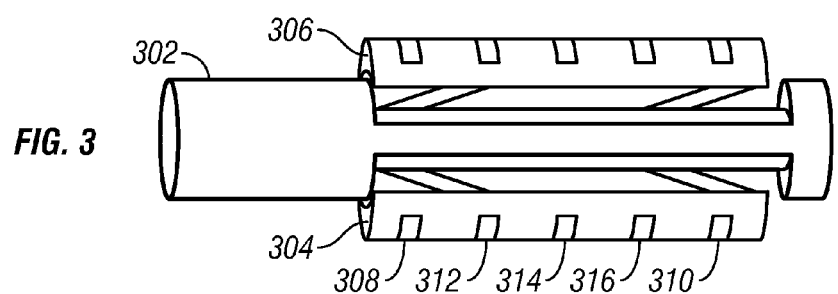
FIG. 3
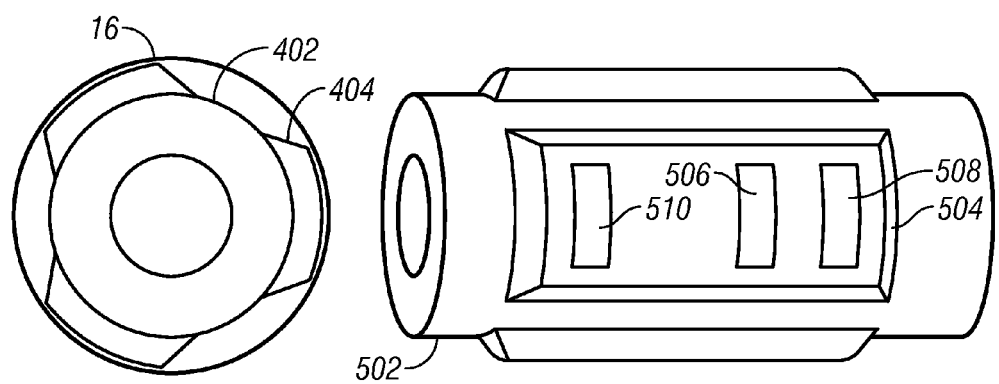
FIG. 4  FIG. 5
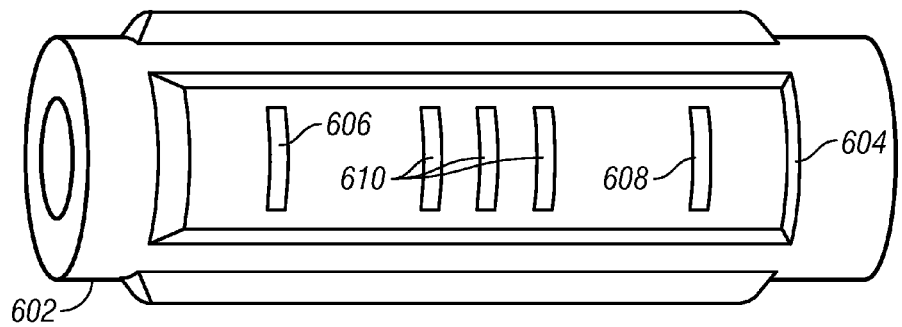
FIG. 6

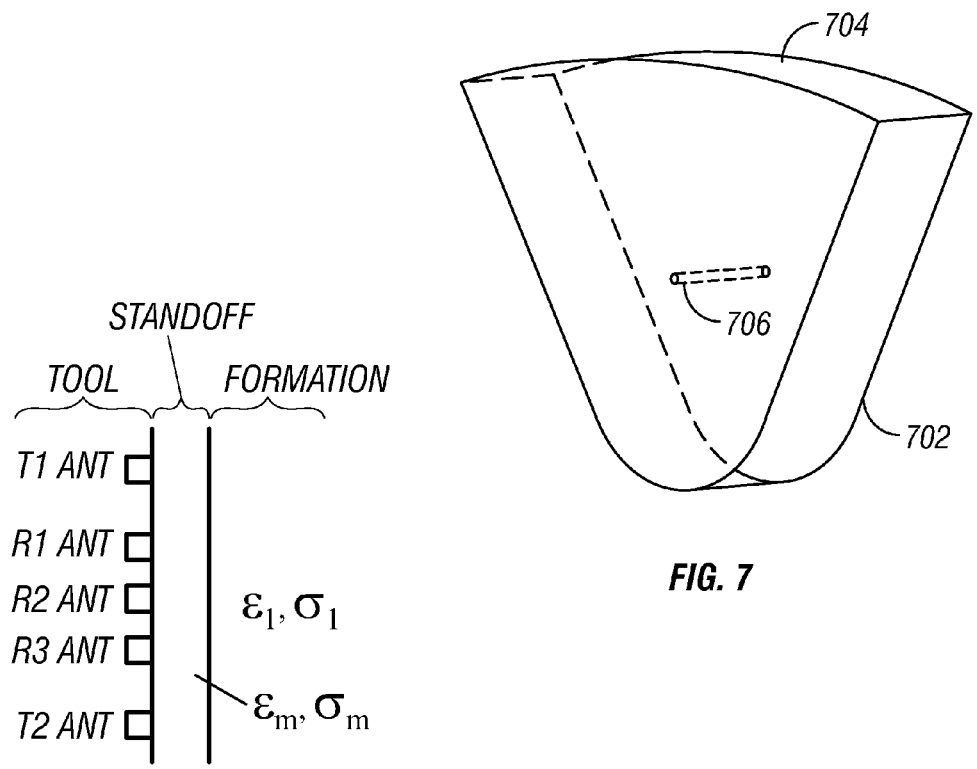
FIG. 7
FIG. 8
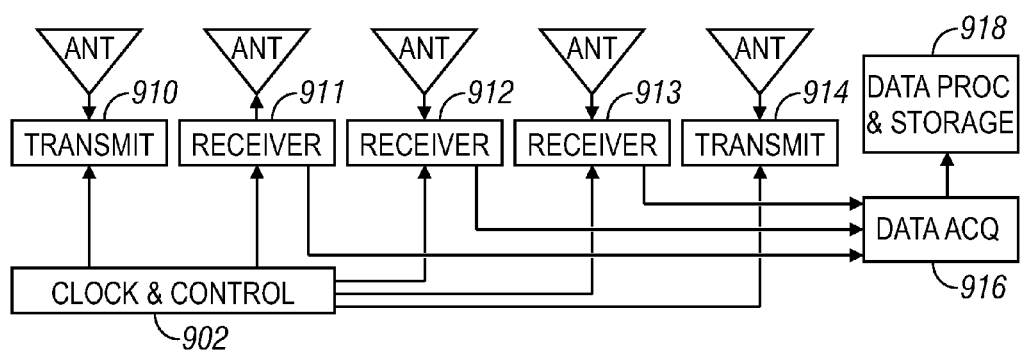
FIG. 9

HIGH FREQUENCY DIELECTRIC MEASUREMENT TOOL

CROSS-REFERENCE TO RELATED APPLICATIONS

This application claims priority to U.S. Provisional Patent Application 61/117,433, titled "A 3D borehole Imager and a Dielectric Measurement Tool" and filed Nov. 24, 2008 by inventors M. Bittar, J. Li, and S. Zannoni.

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging, "logging while drilling" (LWD), drillpipe conveyed logging, and coil tubing conveyed logging.

In wireline logging, a probe or "sonde" is lowered into the borehole after some or all of the well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations.

In drillpipe or coil tubing conveyed logging, sensing instruments are mounted on a tubing string, which moves the instrument package through an existing borehole. The tubing string enables logging of horizontal well bores without requiring the sensing instruments to tolerate the hostile drilling environment. Typically, the measurement data is stored in internal memory and recovered along with the instrument package.

One example of a logging tool is a wireline dielectric tool. Dielectric tools determine the dielectric constant and conductivity of downhole formations from the real and imaginary parts of the complex propagation constant of electromagnetic waves traveling through the formations. (See, e.g., T. J. Calvert, R. N. Rau and L. E. Wells, "Electromagnetic propagation...A new dimension in logging," presented at the Annual Meeting SPE, Bakersfield, Calif., April 1977, Paper 6542; D. S. Daev, Vysokochastonye Electromagnitnye Melody Issledevity. Skhvazhin:publ.House "Nedra," Moscow, 1970; and R. A. Meador and P. T. Cox, "Dielectric constant logging, a salinity independent estimation of formation water volume," presented at the Annual Meeting SPE, Dallas, Tex., Oct. 1, 1975, Paper 5504). By measuring the phase difference and amplitude ratio between two points in the formation, the tool determines the formation resistivity and dielectric constant. These measurements are useful for finding water-filled porosity (Poley, J. Ph., Nooteboom, J. J., de Waal, P. J.: "Use of VHF Dielectric Measurements for Borehole Formation Analysis," The Log Analyst vo. 19, pp 8-30 May-June 1978), and water saturation can be computed if formation porosity is known. If multiple water saturation measurements are available (e.g., from different types of logging tools), it becomes possible to measure characteristics of the flushed zone.

Existing tool designs have undesirable limitations on accuracy and operating range.

BRIEF DESCRIPTION OF THE DRAWINGS

A better understanding of the various disclosed embodiments can be obtained when the following detailed description is considered in conjunction with the attached drawings, in which:

FIG. 1 shows an illustrative logging while drilling (LWD) environment;

FIG. 2 shows an illustrative wireline logging environment;

FIG. 3 shows an illustrative antenna arrangement for a wireline dielectric logging tool;

FIG. 4 shows an end-view of an illustrative dielectric LWD dielectric tool;

FIG. 5 shows an illustrative antenna arrangement for a LWD dielectric tool;

FIG. 6 shows a second illustrative antenna arrangement for a LWD dielectric tool;

FIG. 7 shows an illustrative broadband horn antenna;

FIG. 8 shows parameters of an illustrative tool model;

FIG. 9 is a block diagram of illustrative tool electronics;

Figure 10A:
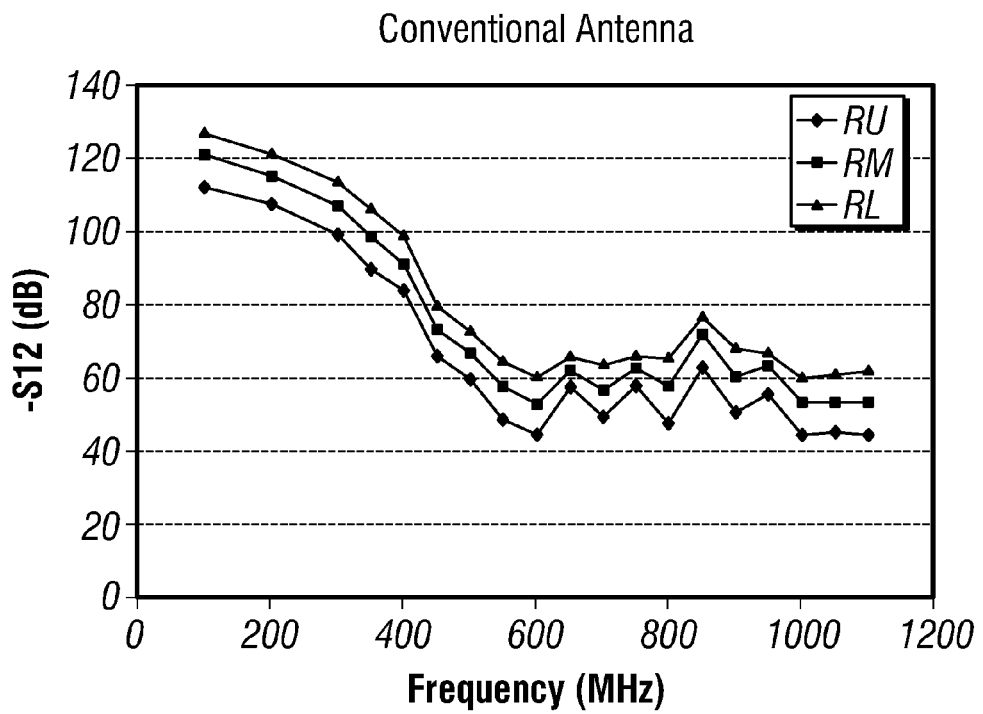
FIGS. 10A and 10B show attenuation curves for a rectangular horn antenna and a broadband horn antenna.

While the invention is susceptible to various modifications and alternative forms, specific embodiments thereof are shown by way of example in the drawings and will herein be described in detail. It should be understood, however, that the drawings and detailed description thereto are not intended to be limiting, but on the contrary, the intention is to cover all modifications, equivalents and alternatives falling within the scope of the appended claims.

DETAILED DESCRIPTION

The issues described in the background are at least in part addressed by one or more of the dielectric logging tools and methods disclosed herein. At least some tool embodiments employ three or more receive horn antennas positioned between at least two transmit antennas, which can also be horn antennas. (As used herein, the term horn antenna refers to a waveguide having an increasing cross-sectional area and an open end for radiating electromagnetic energy. In at least some embodiments, the waveguide is filled with a dielectric material.) The logging tools can operate in the range between 100 MHz and 10 GHz to provide logs of formation permittivity, formation conductivity, standoff distance, and electrical properties of material in the standoff gap. Logs of water-saturated porosity and/or oil movability can be readily derived. The presence of additional receive antennas offers a significantly extended operating range, additional depths of investigation, increased measurement accuracy, and further offers compensation for tool standoff and mudcake effects.

In both wireline and logging while drilling embodiments, at least some disclosed dielectric logging tools employ a set of three axially-spaced receive antennas positioned between pairs of axially-spaced transmit antennas. At least some disclosed methods employ absolute amplitude and phase measurements in response to alternate firings of the transmit antennas, unlike some existing dielectric tools that only make attenuation and phase shift measurements differentially between the outputs of two receivers. (Absolute phase and amplitude measurements are measurements made relative to a common reference such as the phase and amplitude of the transmitted signal.) Differential measurements, while reducing the effect of mudcake on the tool response, also reduce the dynamic range of the signals. Absolute measurements further provide additional depths of investigation compared to differential measurements. If a differential measurement is desired, it can be obtained from the absolute measurement whereas the converse is not true. Continuous operation of the transmitter and receiver channels can be employed to overcome switching transients and to improve measurement sensitivity in highly attenuating (conductive) formations.

The disclosed logging tools and methods are best understood in the context of the larger systems in which they operate. Accordingly, FIG. 1 shows an illustrative logging-while-drilling ("LWD") environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations. A pump 18 circulates drilling fluid 20 through a feed pipe 22, through the interior of the drill string 8 to drill bit 14. The fluid exits through orifices in the drill bit 14 and flows upward through the annulus around the drill string 8 to transport drill cuttings to the surface, where the fluid is filtered and recirculated.

The drill bit 14 is just one piece of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

A LWD dielectric tool 24 is integrated into the bottom-hole assembly near the bit 14. As the bit extends the borehole through the formations, the dielectric logging tool 24 rotates and collects azimuthally-dependent reflection measurements that a downhole controller associates with tool position and orientation measurements. The measurements can be stored in internal memory and/or communicated to the surface. A telemetry sub 26 may be included in the bottom-hole assembly to maintain a communications link with the surface. Mud pulse telemetry is one common telemetry technique for transferring tool measurements to surface receivers and receiving commands from the surface, but other telemetry techniques can also be used.

At the surface, a data acquisition module 36 receives the uplink signal from the telemetry sub 26. Module 36 optionally provides some preliminary processing and digitizes the signal. A data processing system 50 (shown in FIG. 1 as a computer) receives a digital telemetry signal, demodulates the signal, and displays the tool data or well logs to a user. Software (represented in FIG. 1 as information storage media 52) governs the operation of system 50. A user interacts with system 50 and its software 52 via one or more input devices 54 and one or more output devices 56.

At various times during the drilling process, the drill string 8 may be removed from the borehole as indicated in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. A dielectric logging portion of the logging tool 34 may have sensing pads 36 that slide along the borehole wall as the tool is pulled uphole. A logging facility 44 collects measurements from the logging tool 34, and includes computing facilities for processing and storing the measurements gathered by the logging tool.

FIG. 3 shows an illustrative antenna arrangement for a wireline dielectric logging tool 302. The dielectric logging tool 302 includes one or more pads 304, 306 that extend from the tool body to contact the borehole wall. One or more of these pads places an arrangement of antennas in close proximity to the wall. The antenna arrangement shown in FIG. 3 includes a pair of axially-spaced transmitting antennas 308, 310 and three receiving antennas 312, 314 and 316 axially spaced between the transmitters. In an alternative wireline tool embodiment, the antenna arrangement is embedded in the tool surface, and an arm extends from the opposite side of the tool body to hold the antenna arrangement in close proximity to the borehole wall. Wireline tools also use the directional information sensors to orient images.

FIG. 4 shows an LWD dielectric logging tool 402 in a borehole 16. Tool 402 includes two or more stabilizers 404 that maintain the tool near the center of the borehole and, in so doing, minimize the standoff between the wall-contacting surfaces of the stabilizers and the borehole wall. It is desirable to minimize the thickness of the fluid layer between the sensing surface and the portions of the wall being measured. Other mechanisms can be employed to minimize standoff in the LWD dielectric tool, including pads mounted on extendable arms or biasing springs. Alternatively, such arms or springs may be used to force the tool body itself against the borehole wall. Though suitable for this application, such mechanisms may not be as robust as a sensing surface embedded in a stabilizer.

FIG. 5 shows a side-view of the LWD dielectric tool 502, having one or more stabilizers 504 is an illustrative antenna arrangement. The three-antenna arrangement of FIG. 5 includes a single transmitter antenna 506 between two receiver antennas 508, 510 which are spaced at different distances from the transmitter antenna. The asymmetric receiver spacing offers four independent phase and amplitude measurements, which may not be sufficient when it is desired to compensate for variations in standoff distance.

FIG. 6 shows a side-view of an alternative LWD dielectric tool 602. One or more of the tool's stabilizers 604 include an antenna arrangement having at least five antennas on the wall-contacting surface. The five-antenna arrangement includes two transmitters 606, 608, and three axially-spaced receiver antennas 610 positioned between the transmitters. Some embodiments include one or more additional pairs of transmitter antennas at different distances from the group of three receiver antennas.

As the LWD dielectric tool rotates and progresses downhole at the drilling rate, each sensing surface will trace a helical path on the borehole wall. Orientation sensors within the tool can be used to associate the measurements with the sensors' positions on the borehole wall. Electronics within the tool can aggregate measurements versus position to form a detailed map of the borehole wall, which can be stored for later retrieval or compressed and transmitted to the surface for timely use by the drilling team. If sufficient telemetry bandwidth is available, surface computing facilities can collect formation property measurements, orientation (azimuth) measurements, and tool position measurements, and process the collected measurements to create and display the map.

In the wireline and LWD dielectric tools, each of the antennas can take the form of a horn antenna. In the embodiments of FIGS. 3-6, each of the antennas take the form of an antenna horn having the shape shown in FIG. 7. Horn 702 has an aperture 704 that conforms to the external surface of the tool body. In one embodiment, the aperture is 0.77 cm high and 6.00 cm wide, with a profile having a 15.0 cm radius. The depth of the horn is 3.00 cm, and the feed point 706 is located 1.5 cm from the tip of the horn, which has a circular profile of 1.5 cm radius. The interior of the horn is filled with a ceramic material having a dielectric constant in the range of 80-100, making the horn efficient for transmitting and receiving in the range from 400 MHz to 1 GHz. Alternative embodiments employ other horn shapes and other types of antennas.

Figure 10B:
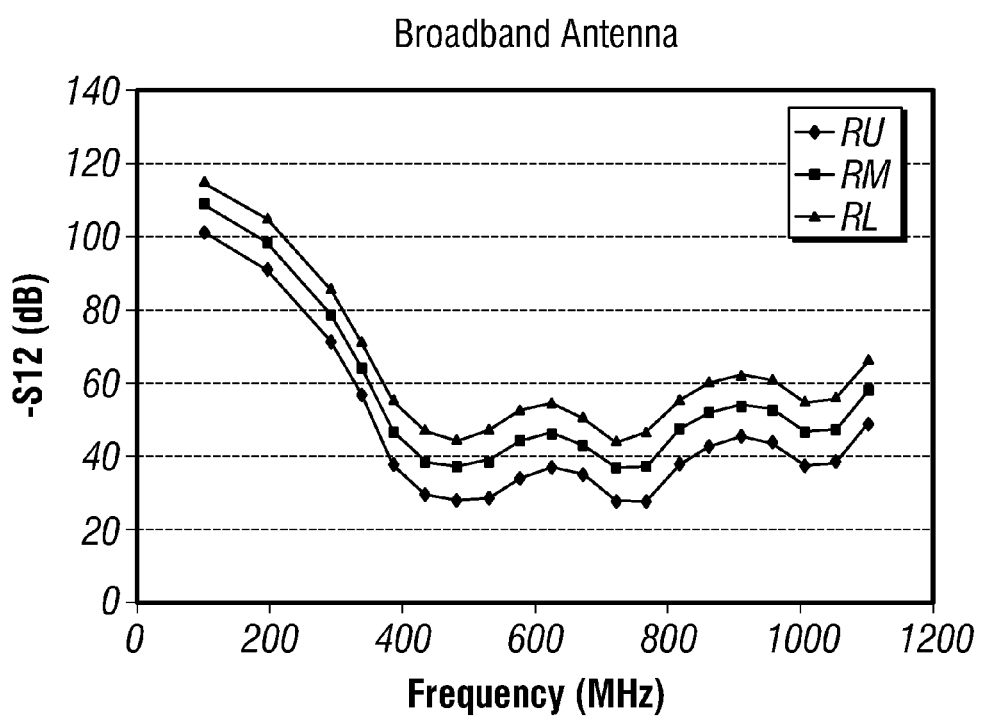

FIGS. 10A and 10B show attenuation curves for the traditional rectangular horn antenna (FIG. 10A) and the broadband horn antenna design of FIG. 7 (FIG. 10B). The upper curve (RU) shows the modeled attenuation of the signal received by the receiver closest to the transmitter (FIG. 6), the middle curve (RM) shows the attenuation of the signal received by the middle receiver, and the lower curve (RL) shows the attenuation of the signal received by the receiver furthest from the antenna. Focusing for the moment on the middle curves, the antenna performances match at 1 GHz (approximately 52 dB of attenuation), but the performance of the traditional horn antenna degrades to roughly 60 dB for lower frequencies, with a narrow valley around 600 MHz (about 52 dB) before climbing steeply for all frequencies below 600 MHz. Conversely, the performance of the custom broadband design is roughly constant throughout the 850 MHz to 1 GHz frequency range, and improves to roughly 40 dB for the 400-800 MHz frequency range before climbing steeply for lower frequencies. Moreover, with judicious increases to the antenna dimensions, the lower limit of the antenna's frequency band can be expanded to 100 MHz. Though the illustrated antenna has been tuned for peak performance at three frequencies (500 MHz, 750 MHz, and 1050 MHZ), the chosen frequencies can be adjusted to match the desired operating frequencies for the tool.

The horn antenna shown in FIG. 7 is specially designed for the disclosed tool. Compared to traditional rectangular horns, it not only has ultra wide frequency band, but also has a compact shape and size to facilitate use in downhole applications. The traditional horns working at a few hundred MHz are not suitable for downhole use due to their giant sizes. Conversely, the cavity antennas used by the existing downhole tools are appropriately sized, but can only be tuned to deliver optimum performance at a single frequency. Horn antennas having the design of FIG. 7 can provide optimum performance at multiple frequencies, thereby avoiding undue limitations on frequency selection and maximizing the flexibility of the tool.

FIG. 8 shows a model of the tool environment. The drill collar is surrounded by oil-based mud having permittivity $\in_m$ and conductivity $\sigma_m$. The standoff distance d between the antennas and the borehole wall can vary with the tool-face angle in eccentric boreholes. Outside the borehole is the formation (having permittivity $\in_1$ and conductivity $\sigma_1$). The resulting model has five parameters: a standoff distance d, a formation permittivity $\in_1$, a formation conductivity $\sigma_1$, a borehole fluid permittivity $\in_M$, and a borehole fluid conductivity $\sigma_M$.

Each of the three receivers provides an attenuation and phase shift measurement in response to each transmitter firing, thereby providing six independent measurements. Six additional measurements are obtained in response to the second transmitter. These six additional measurements can optionally be combined with the first six to provide a set of compensated measurements, i.e., measurements that compensate for variations in the tool electronics. The five model parameters are over-determined and can be estimated using a least-squares technique.

For wireline applications, the operating principles are the same. The sensors can be mounted on a rotating head to provide full azimuthal scanning at each depth in the well. Alternatively, sensors can be mounted at different azimuthal orientations on the tool to provide "azimuthally sampled" coverage.

FIG. 9 shows a block diagram of the electronics for an illustrative dielectric logging tool. The tool electronics include a system clock and control unit 902, two transmitters 910, 914, three receivers 911-913, a multichannel data acquisition unit 916, a data processing and storage unit 918, and the transmitting and receiving antennas discussed previously.

The clock and control unit 902 determines the sampling rate of the system. To do each measurement, unit 902 sends a trigger signal to the receivers 911-913 and the selected transmitter 910 or 914. Upon receiving a trigger signal, the selected transmitter sends an electromagnetic signal into the formation through the transmitting antenna. The trigger signal also causes the receivers start sampling the receive signals. The receivers 911-913 sample and output analog signals to the data acquisition unit 916, which converts the analog signals into digital signals. The processing and storage unit 918 processes the received digital signals to extract measurement information. The extracted information can be stored and/or transmitted via the telemetry system to the surface for real-time monitoring.

The frequency content of the transmitted signals is limited and preferably concentrated at a small number of selected frequencies, e.g., in the range from 1 to 6 selected frequencies. The windowed signal pulses may be between 10 microseconds to 10 milliseconds long. At each signal frequency, the tool measures received signal attenuation and phase shift relative to the transmitted signal (i.e., "absolute attenuation and phase measurements"). These measurements are made at each receiver in response to each transmitter, with the transmitters firing in turn. From the absolute phase and attenuation measurements, the differential phase and attenuation measurements can be calculated, i.e., the phase and attenuation of the signal frequency measured at one receiver relative to the phase and attenuation of that signal frequency at another receiver. Thus, a tool having two transmitters and three receivers yields six absolute measurements (R1T1, R2T1, R3T1, R1T2, R2T2, and R3T2) and six differential measurements (R1T1–R2T1, R2T1–R3T1, R1T1–R3T1, R1T2–R2T2, R2T2–R3T2, and R1T2–R3T2) of phase shift at each frequency, and another six absolute measurements and six differential measurements of attenuation at each frequency.

Figure 11:
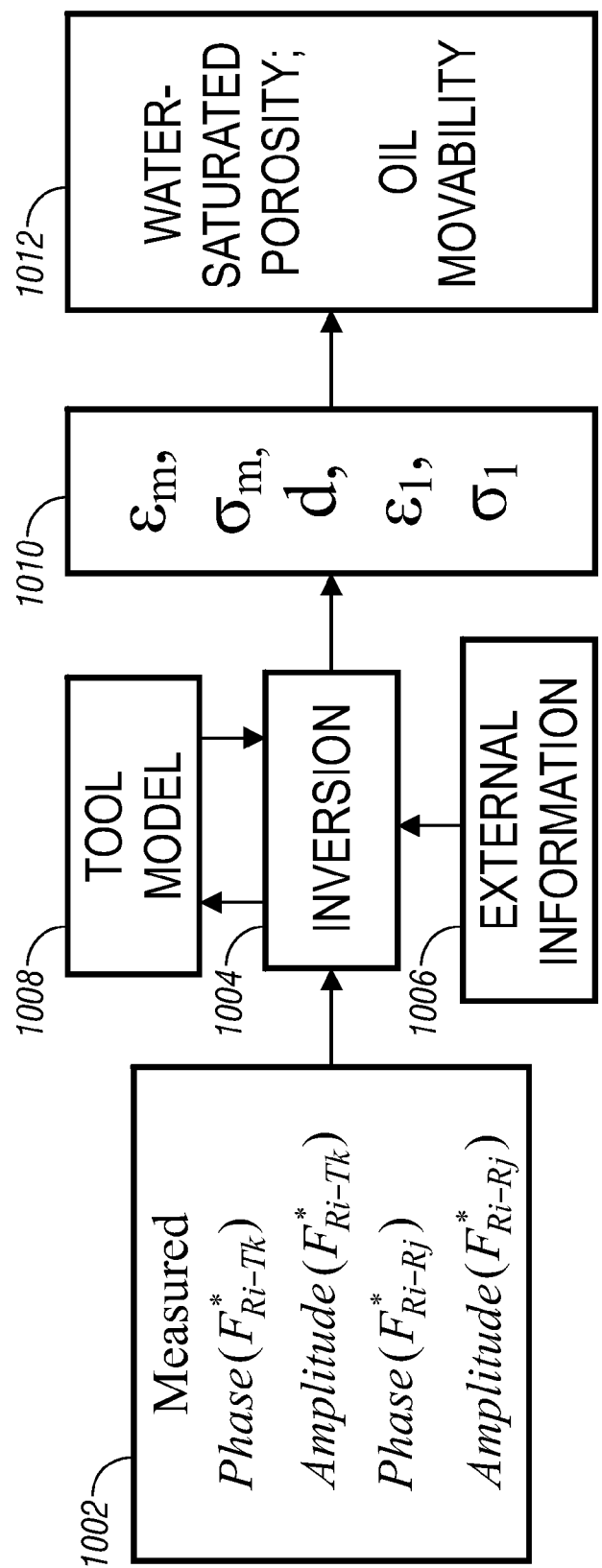
FIG. 11 shows an illustrative data flow diagram for a dielectric tool.

FIG. 11 is a data flow diagram showing the absolute phase and amplitude (or attenuation) measurements at block 1002. An inversion process represented by block 1004 processes these measurements along with external parameter information 1006 (such as initial estimates of borehole diameter and characteristics of the transmitted signal) to estimate environmental parameters such as the standoff d, mud conductivity and dielectric constant, and the formation conductivity and dielectric constant. Block 1008 represents a tool model which accepts estimated environmental parameters and predicts the tool measurements of amplitude and phase at each frequency. The inversion process 1004 compares the predicted tool measurements to the actual tool measurements 1002 and refines its estimates of environmental parameters until the predicted tool measurements converge to the actual tool measurements. Once convergence is reached, process 1004 outputs the desired environmental parameters such as the standoff d, mud conductivity and dielectric constant, and the formation conductivity and dielectric constant 1010. This process is repeated for each of the tool positions to obtain logs of these environmental parameters 1010.

The dielectric constant is an important formation property. It varies a lot among different materials, for example 4 to 8 for oil-saturated sand and 81 for water. Hence measurements of dielectric constants can provide us with significant formation information, including material type, water-saturated porosity, water movability in oil mud, etc. Block 1012 represents the processing of the formation conductivity and dielectric constant to estimate water-saturated porosity, and when monitored over time, formation fluid movability. Various estimation procedures are well known and can be used.

Figure 12:
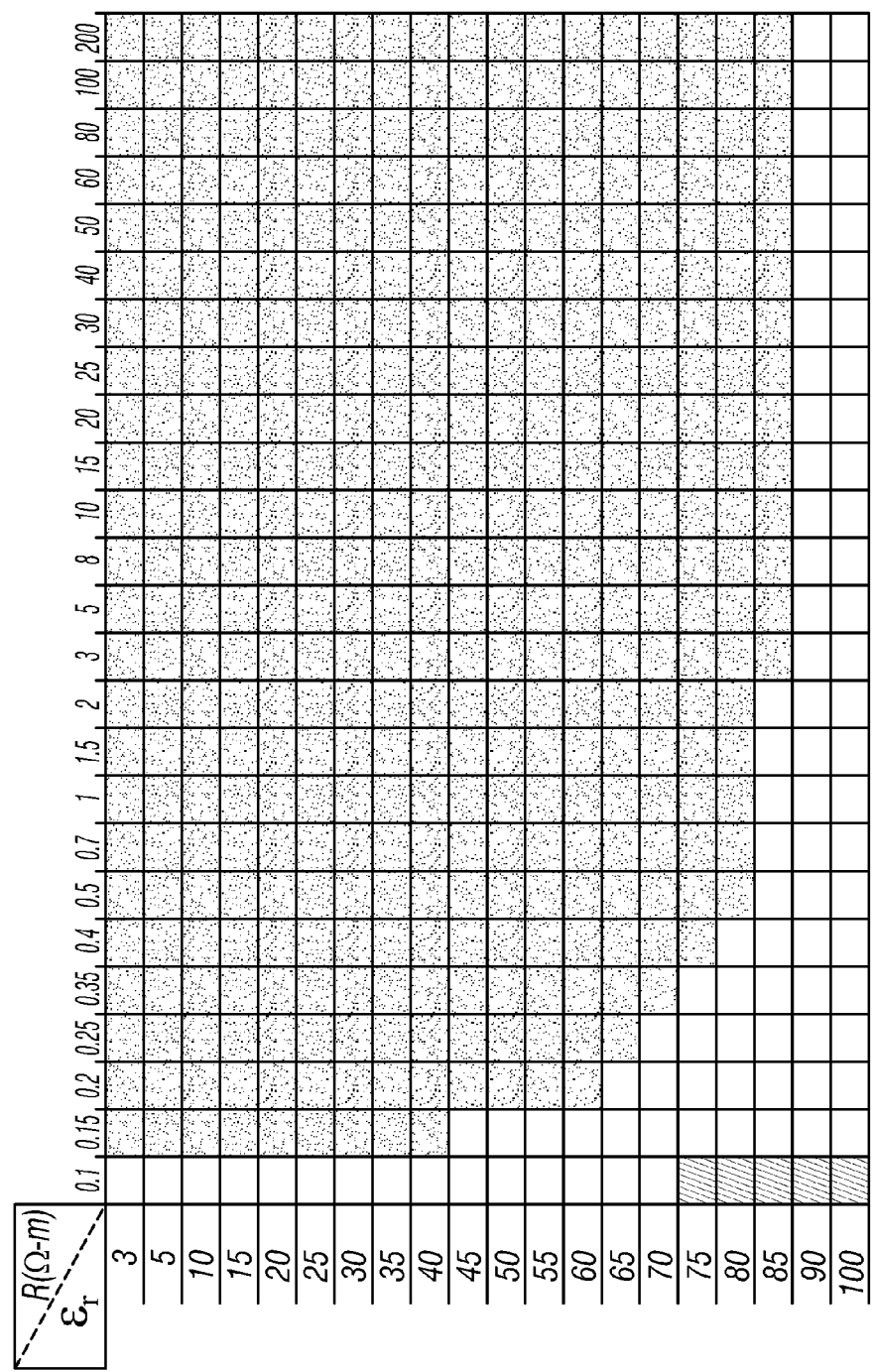
FIG. 12 shows an illustrative dynamic range comparison for different dielectric tools.

FIG. 12 shows a comparison of the expected performance of the two-transmitter, three-receiver dielectric logging tool relative to existing dielectric logging tools introduced in U.S. Pat. Nos. 3,944,910 (Rau) and 4,704,581 (Clark), hereafter referred to as a two-transmitter two-receiver tool. The region in the upper right of the chart represents the area where the authors believe the two-transmitter two-receiver dielectric tools yield acceptable measurements of conductivity and dielectric constant. The four squares in the bottom left corner of the chart represent the area where the authors have not yet demonstrated acceptable measurement accuracy with the proposed tool. The intermediate region is the additional area in which the proposed tool can provide accurate measurements where the existing tools cannot. Roughly speaking, the proposed tool extends the measurement range to highly conductive formations (R<0.15 ohm-m) and formations with high dielectric constants ($\epsilon_r$>80).

Figure 13A:
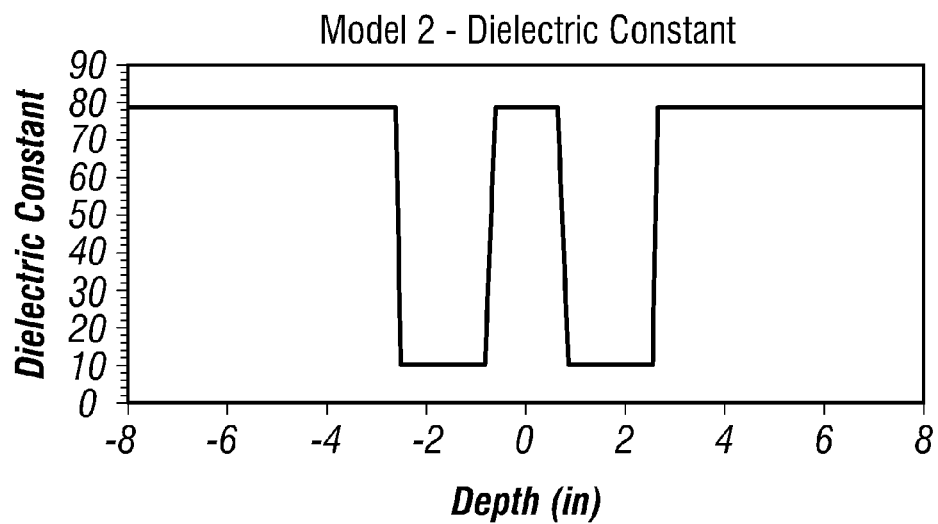
FIGS. 13A-13F show an illustrative measurement resolution comparison for different dielectric tools.
Figure 13B:
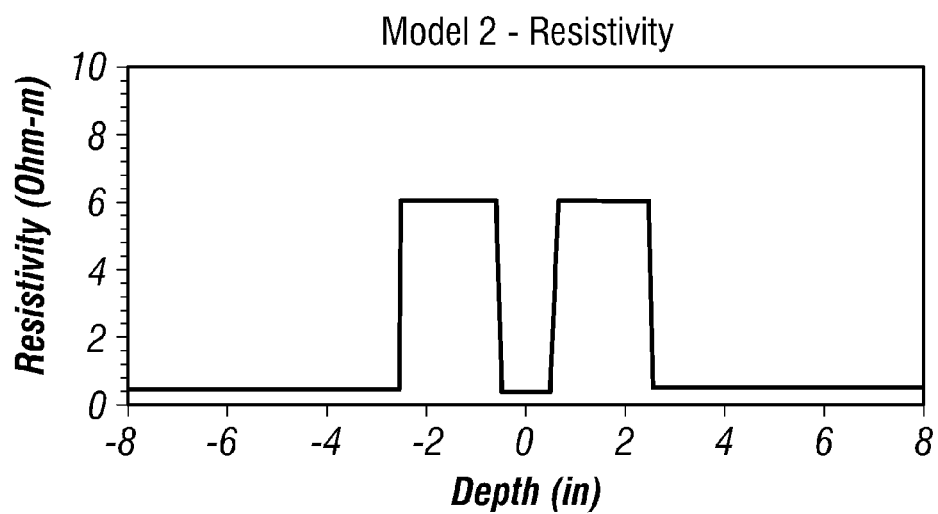
Figure 13C:
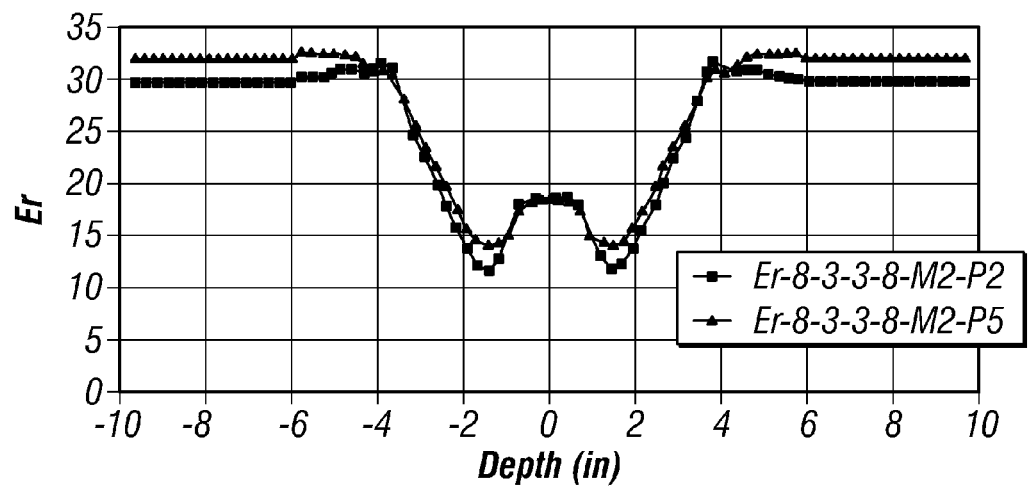
Figure 13D:
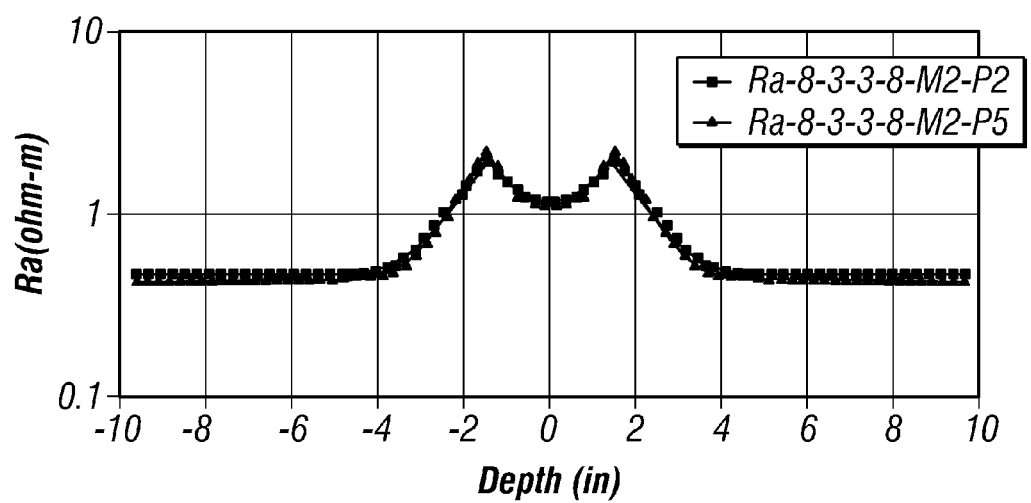
Figure 13E:
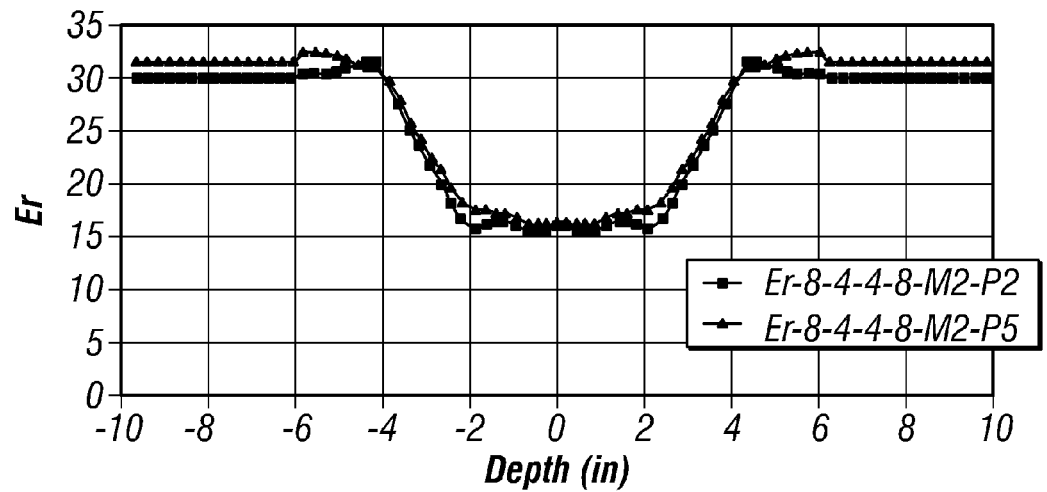
Figure 13F:
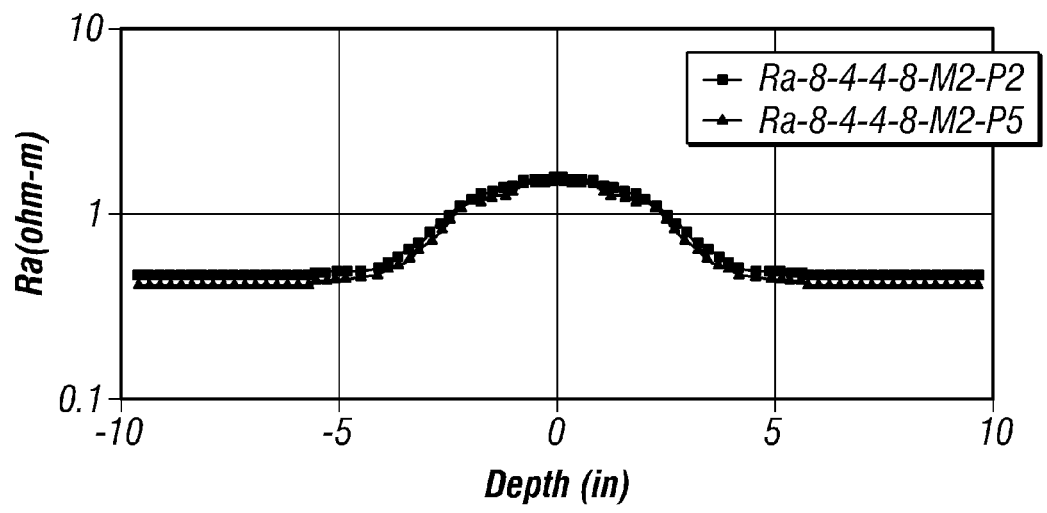

FIGS. 13A and B show a simulated formation having two 2-inch beds spaced 1 inch apart in a surrounding matrix having $\epsilon_r$=80 and R=0.5 ohm-m. The two formation beds have $\epsilon_r$=10 and R=6 ohm-m. FIGS. 13C and D have the simulated permittivity and resistivity measurements of the proposed tool, whereas FIGS. 13E and F have the simulated permittivity and resistivity measurements of an existing two-transmitter two-receiver tool. The proposed tool clearly indicates the presence of two beds, whereas the existing tool fails to detect that multiple beds are present.

The two-transmitter three-receiver dielectric tool (which can have smaller spacing between receivers) offers potential advantages over the two-transmitter two-receiver tool in the following aspects: 1) offering a wider dynamic measuring range for both formation resistivity and dielectric constant; 2) providing a higher vertical resolution; 3) possessing better ability to resist the tool standoff effect; and 4) capable of performing multiple depth investigation. It is found that the antenna spacing plays an important role in determining the tool's measurement resolution, dynamic range, detection depth, and the ability to compensate the possible standoff effect.

Numerous variations and modifications will become apparent to those skilled in the art once the above disclosure is fully appreciated. It is intended that the following claims be interpreted to embrace all such variations and modifications.

What is claimed is:

1. A dielectric logging tool that comprises:
   a first transmitter antenna;
   a second transmitter antenna spaced axially from the first transmitter antenna;
   three axially spaced receiver antennas positioned between the first and second transmitter antennas; and
   a processing system, wherein each of the transmitter and receiver antennas are horn antennas providing a usable frequency range between about 100 Mhz and 10 GHz; and
   wherein the processing system determines a standoff distance between the tool and a borehole wall based on measurements provided by each of the receiver antennas.

2. The tool of claim 1, wherein the horn antennas are tuned to operate at multiple signal frequencies.

3. The tool of claim 1, wherein the transmit antennas transmit signals having energy concentrated at one or more selected frequencies in the range between about 100 Mhz and 10 GHz, and wherein the tool further comprises electronics that measure amplitude and phase of the one or more selected frequencies in the receive signal.

4. The tool of claim 1, wherein the processing system further determines conductivity and permittivity of a formation penetrated by a borehole containing the tool.

5. The tool of claim 4, wherein the processing system further determines a conductivity and permittivity of a borehole fluid.

6. The tool of claim 4, wherein the transmitter and receiver antennas are positioned against a borehole wall during measurements.

7. The tool of claim 1, wherein the tool is a logging while drilling tool.

8. The tool of claim 7, further comprising a plurality of stabilizers, at least one of which maintains the antennas in close proximity to the borehole wall.

9. The tool of claim 1, wherein the tool is a wireline tool.

10. A logging method that comprises:
    moving a logging tool along a borehole, wherein the logging tool comprises at least three receive antennas positioned between at least two transmit antennas, wherein each of the transmitter and receiver antennas are horn antennas providing a usable frequency range between about 100 Mhz and 10 GHz;
    measuring characteristics of a receive signal with each of the at least three receive antennas in response to operation of each of the at least two transmit antennas;
    determining a standoff distance between the tool and a borehole wall based on measurements provided by each of the receive antennas;
    determining formation permittivity values based at least in part on said characteristics; and
    associating the permittivity values and standoff distance with tool position to provide a dielectric log.

11. The method of claim 10, wherein the logging tool is a wireline logging tool.

12. The method of claim 10, wherein the logging tool is a logging-while-drilling tool.

13. The method of claim 10, wherein the receive antennas are horn antennas that operate in contact with the borehole wall.

14. The method of claim 10, wherein the characteristics are indicative of receive signal attenuation and phase shift relative to a transmit signal.

15. The method of claim 14, further comprising determining formation conductivity values based at least in part on said characteristics.

16. The method of claim 15, further comprising determining electrical properties of material in the standoff gap.

17. A non-transitory information storage medium having software comprising:
- a measurement module that obtains measurements made via at least three receive antennas in response to two antennas spaced in opposite axial directions from the receive antennas, wherein the antennas are horn antennas providing a usable frequency range between about 100 Mhz and 10 GHz;
- a processing module that determines a standoff distance between a logging tool and a borehole wall based on measurements provided by each of the receive antennas;
- a tool module that predicts tool measurements based on estimated formation properties;
- an inversion module that adjusts estimated formation properties until predictions of the tool module match the measurements obtained by the measurement module; and
- a display module that provides a log of at least one formation property as a function of tool position or depth.

18. The medium of claim 17, wherein the at least one formation property comprises permittivity.

19. The medium of claim 17, wherein the at least one formation property comprises water-saturated porosity.

20. The medium of claim 17, wherein the at least one formation property comprises oil movability.

21. The medium of claim 17, wherein the measurements include attenuation and phase shift relative to the transmit signal.

* * * * *